United States Patent
Yamamoto et al.

(10) Patent No.: US 8,475,942 B2
(45) Date of Patent: Jul. 2, 2013

(54) HARD-COATING-COATED MEMBER, TOOL, AND TARGET

(75) Inventors: Kenji Yamamoto, Kobe (JP); German Fox-Rabinovich, Hamilton (CA)

(73) Assignee: Kobe Steel, Ltd., Kobe-shi (JP)

(*) Notice: Subject to any disclaimer, the term of this patent is extended or adjusted under 35 U.S.C. 154(b) by 127 days.

(21) Appl. No.: 12/987,474

(22) Filed: Jan. 10, 2011

(65) Prior Publication Data
US 2011/0197786 A1 Aug. 18, 2011

(30) Foreign Application Priority Data
Feb. 16, 2010 (JP) ................................. 2010-031006

(51) Int. Cl.
B32B 9/00 (2006.01)

(52) U.S. Cl.
USPC .......... 428/697; 51/307; 51/309; 204/298.13; 428/698; 428/699

(58) Field of Classification Search
USPC . 428/697, 698, 699; 51/307, 309; 204/298.13
See application file for complete search history.

(56) References Cited

U.S. PATENT DOCUMENTS

| | | | | |
|---|---|---|---|---|
| 4,284,687 A * | 8/1981 | Dreyer et al. | | 428/472 |
| 6,254,984 B1 * | 7/2001 | Iyori | | 428/699 |
| 7,935,426 B2 * | 5/2011 | Vetter | | 428/698 |
| 8,003,231 B2 * | 8/2011 | Yamamoto | | 428/697 |
| 8,025,956 B2 * | 9/2011 | Yamamoto et al. | | 428/698 |
| 8,025,990 B2 * | 9/2011 | Yamamoto et al. | | 428/697 |
| 8,119,261 B2 * | 2/2012 | Vetter | | 428/697 |
| 2008/0003418 A1 | 1/2008 | Yamamoto et al. | | |
| 2009/0269614 A1 | 10/2009 | Yamamoto et al. | | |

FOREIGN PATENT DOCUMENTS

| | | | |
|---|---|---|---|
| EP | 1 873 273 A1 | | 1/2008 |
| EP | 2 116 628 A1 | | 11/2009 |
| JP | 05-330956 | * | 12/1993 |
| JP | 8-199340 | | 8/1996 |
| JP | 8-209334 A | | 8/1996 |
| JP | 2000-297365 | | 10/2000 |
| JP | 2003-71611 | | 3/2003 |
| JP | 2007-254785 | * | 10/2007 |
| JP | 2008-7835 | | 1/2008 |
| KR | 10-2009-0100374 A | | 9/2009 |

OTHER PUBLICATIONS

Office Action issued Jul. 27, 2012, in Chinese Patent Application No. 201010625215.4 with English translation.
Extended European Search Report issued May 17, 2011, in Application No. / Patent No. 11000156.7-2122.
Office Action issued Oct. 4, 2012 in Korean Patent Application No. 10-2011-0013148 (with English-language translation).

* cited by examiner

*Primary Examiner* — Archene Turner
(74) *Attorney, Agent, or Firm* — Oblon, Spivak, McClelland, Maier & Neustadt, L.L.P.

(57) ABSTRACT

A member covered with a hard coating having good wear resistance, a tool using the member, and a target for forming the hard coating are provided. A hard-coating-coated member has a hard coating on a substrate, in which the hard coating has a composition of $(Ti_aCr_bAl_cSi_dY_eR_f)(C_yN_z)$, the R being at least one element selected from Ho, Sm, Dy and La, and when the subscripts a, b, c, d, e, f, y and z denote atomic ratios respectively, $0.05 \leq a \leq 0.3$, $0.05 \leq b \leq 0.3$, $0.4 \leq c \leq 0.65$, $0 \leq d \leq 0.05$, $0 \leq e \leq 0.05$, $0.005 \leq f \leq 0.05$, $a+b+c+d+e+f=1$, $0 \leq y \leq 0.3$, $0.7 \leq z \leq 1$, and $y+z=1$ are satisfied.

12 Claims, 2 Drawing Sheets

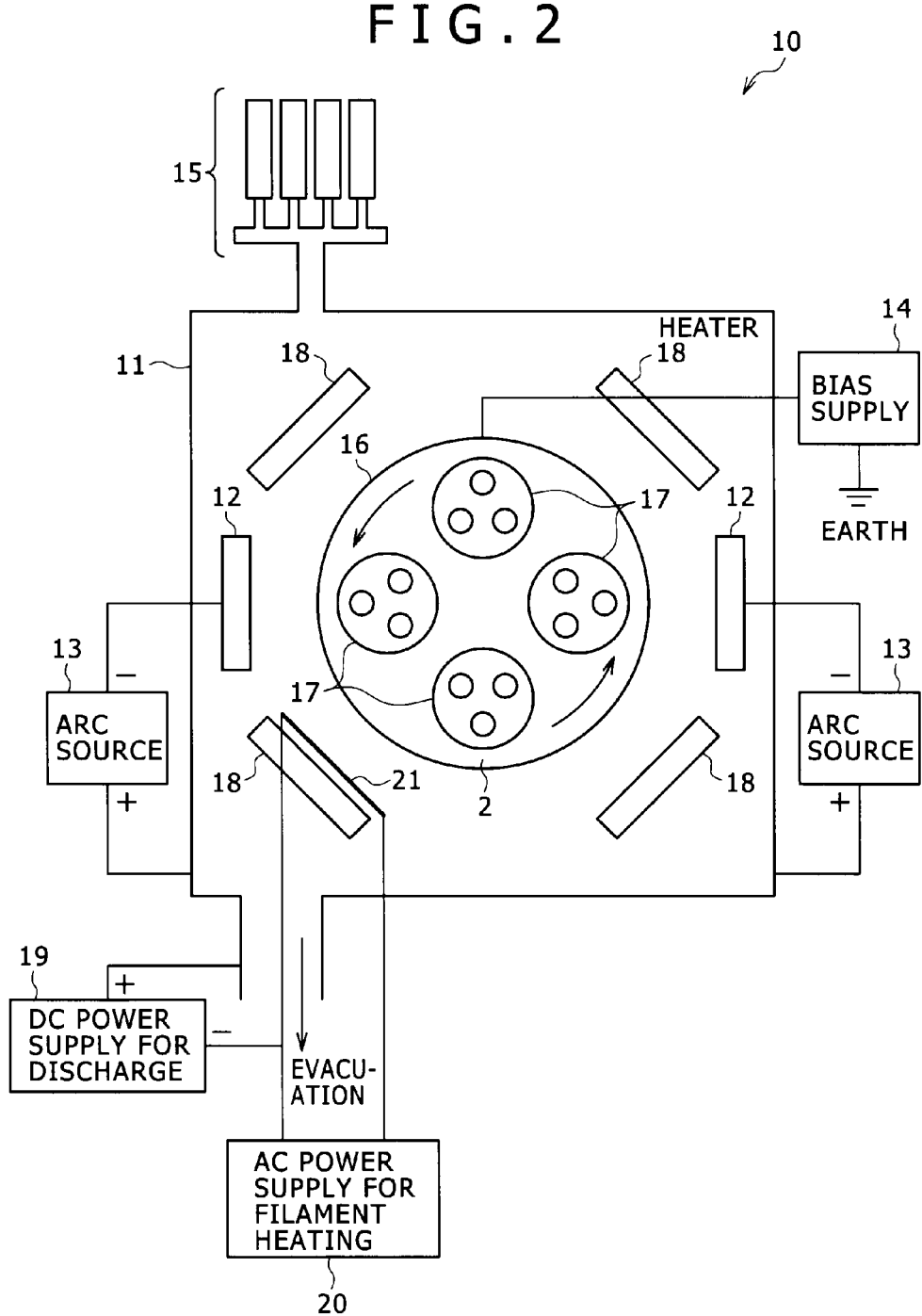

HARD-COATING-COATED MEMBER, TOOL, AND TARGET

BACKGROUND OF THE INVENTION

1. Field of the Invention

The present invention relates to a hard-coating-coated member having a surface covered with a hard coating, a tool using the member, and a target for forming the hard coating.

2. Description of Related Art

In the past, a hard coating including TiAlN has been used for tools such as cutting tools, which are used at high temperature caused by friction heat, in order to improve oxidation resistance and thus lengthen a tool life. In addition, addition of Si, Y or the like has been examined to improve oxidation resistance of the coating.

For example, JP-A-2003-71611 discloses a hard coating for cutting tools, the hard coating including $(Ti_{1-a-b-c-d}, Al_a, Cr_b, Si_c, B_d)(C_{1-e}N_e)$, where $0.5 \leq a \leq 0.8$, $0.06 \leq b$, $0 \leq c \leq 0.1$, $0 \leq d \leq 0.1$, $0.01 \leq c+d \leq 0.1$, $a+b+c+d<1$, and $0.5 \leq e \leq 1$ are given (a, b, c, and d denote atomic ratios of Al, Cr, Si and B respectively, and e denotes an atomic ratio of N).

Moreover, for example, JP-A-2008-7835 discloses a hard coating having good oxidation resistance, the hard coating including $(M)_a Cr_b Al_c Si_d B_e Y_f Z$ (where M denotes at least one element selected from elements of groups 4a, 5a and 6a (except for Cr) of the periodic table, and Z is one of N, CN, NO and CNO), in which $a+b+c+d+e+f=1$, $0<a \leq 0.3$, $0.05 \leq b \leq 0.4$, $0.4 \leq c \leq 0.8$, $0 \leq d \leq 0.2$, $0 \leq e \leq 0.2$, and $0.01 \leq f \leq 0.1$ are given (a, b, c, d, e and f denote atomic ratios of M, Cr, Al, Si, B and Y respectively).

SUMMARY OF THE INVENTION

However, such hard coatings have the following difficulty.

In the related art, a predetermined amount of each predetermined element is added to a hard coating so as to improve oxidation resistance of the hard coating and thus improve wear resistance thereof.

However, cutting speed of a cutting tool or the like is recently increased, leading to a difficulty where a tool to be used is easily worn out due to increase in friction heat caused by such high cutting speed. Therefore, higher oxidation resistance, or higher wear resistance, is demanded for the hard coating to meet such increase in cutting speed.

It is desirable to provide a member covered with a hard coating having good wear resistance, a tool using the member, and a target for forming the hard coating.

A hard-coating-coated member according to an embodiment of the invention (hereinafter, appropriately called member) has a hard coating (hereinafter, appropriately called coating) on a substrate, in which the hard coating has a composition of $(Ti_a Cr_b Al_c Si_d Y_e R_f)(C_y N_z)$, the R being at least one element selected from Ho, Sm, Dy and La, and when the subscripts a, b, c, d, e, f, y and z denote atomic ratios respectively, $0.05 \leq a \leq 0.3$, $0.05 \leq b \leq 0.3$, $0.4 \leq c \leq 0.65$, $0 \leq d \leq 0.05$, $0 \leq e \leq 0.05$, $0.005 \leq f \leq 0.05$, $a+b+c+d+e+f=1$, $0 \leq y \leq 0.3$, $0.7 \leq z \leq 1$, and $y+z=1$ are satisfied. The R may be, for example, at least one selected from three elements Ho, Sm and Dy other than La, or may include La and at least one selected from the three elements Ho, Sm and Dy.

According to such a configuration, a coating contains a predetermined amount of each of Ti and N, leading to increase in hardness of the coating, and contains a predetermined amount of Al so that Al dissolves in TiN and/or CrN being stable cubic structure into metastable cubic structure AlN, leading to increase in hardness of the coating. These improve wear resistance of the member. Furthermore, the coating contains a predetermined amount of R (at least one element selected from Ho, Sm, Dy and La, the same is true hereinafter) and contains a predetermined amount of each of Si and/or Y as necessary, which improves oxidation resistance of the coating. In addition, the coating contains a predetermined amount of Cr, so that the cubic crystal structure of the coating is maintained, which also improves oxidation resistance of the coating. These improve wear resistance of the member. As necessary, the coating contains a predetermined amount of C, so that the coating is in a form of carbonitride.

A hard-coating-coated member according to another embodiment of the invention has a hard coating on a substrate, in which the hard coating has a composition of $(Ti_a Cr_b Al_c Si_d Y_e R_f Hf_g)(C_y N_z)$, the R being at least one element selected from Ho, Sm, Dy and La, and when the subscripts a, b, c, d, e, f, g, y and z denote atomic ratios respectively, $0.05 \leq a \leq 0.3$, $0.05 \leq b \leq 0.3$, $0.4 \leq c \leq 0.6$, $0 \leq d \leq 0.05$, $0 \leq e \leq 0.05$, $0.005 \leq f \leq 0.05$, $0 < g \leq 0.35$, $a+b+c+d+e+f+g=1$, $0 \leq y \leq 0.3$, $0.7 \leq z \leq 1$, and $y+z=1$ are satisfied. The R may be, for example, at least one selected from three elements Ho, Sm and Dy other than La, or may include La and at least one selected from the three elements Ho, Sm and Dy.

According to such a configuration, a coating contains a predetermined amount of each of Ti, Cr, Al, R and N, and contains a predetermined amount of each of Si and/or Y as necessary, leading to increase in hardness of the coating and improvement in oxidation resistance of the coating. The coating further contains a predetermined amount of Hf, which further increases hardness of the coating, leading to further improvement in wear resistance of the member. These further improve wear resistance of the member. As necessary, the coating contains a predetermined amount of C, so that the coating is in a form of carbonitride.

A tool according to an embodiment of the invention has the hard-coating-coated member.

According to such a configuration, the tool has the member, thereby wear resistance of the tool is improved.

A target according to an embodiment of the invention is used to deposit the hard coating by an arc ion plating process, in which the target contains the same metal elements and the same rare-earth elements as in the coating in the same composition ratio as in the coating.

According to such a configuration, the target has the same composition as in the coating of the member, thereby the coating having the composition may be easily and simply formed by an arc-ion-plating evaporation method.

The hard-coating-coated member according to the embodiment of the invention is good in wear resistance and therefore preferably used as a member for a cutting tool or a tool such as a die while improving durability of such a tool. In addition, the tool according to the embodiment of the invention is good in wear resistance and therefore is preferably used as a cutting tool or a molding tool such as a die while improving durability of such a tool. The target according to the embodiment of the invention is used, thereby the hard coating for configuring the hard-coating-coated member according to the embodiment of the invention may be easily and simply formed by the arc-ion-plating evaporation method.

BRIEF DESCRIPTION OF THE DRAWINGS

FIG. 2 is a schematic diagram of a deposition apparatus.

DESCRIPTION OF THE PREFERRED EMBODIMENT

Figure 1:
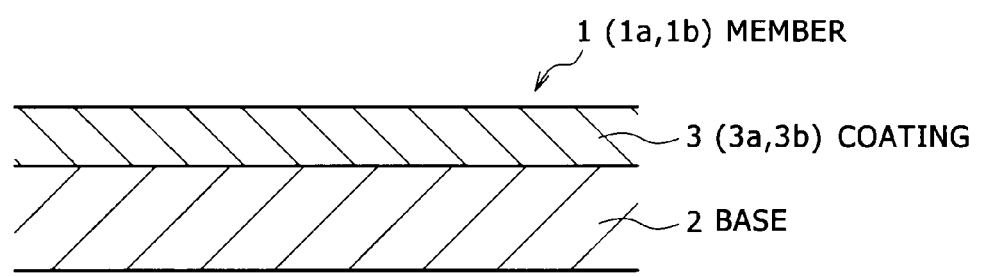
FIG. 1 is a section diagram showing a hard-coating-coated member according to an embodiment of the invention.

Next, a hard-coating-coated member according to an embodiment of the invention will be described in detail with reference to drawings.

Hard-Coating-Coated Member

First Embodiment

As shown in FIG. 1, a hard-coating-coated member (member) 1 (1a) according to the embodiment of the invention includes a hard coating (coating) 3 (3a) on a substrate 2.

Hereinafter, the member is specifically described.

Substrate

The substrate 2 includes sintered hard metal, iron-base alloy having metal carbide, cermet, and high speed tool steel. However, the substrate 2 is not limited to these, and any material may be used as long as the material can be used for members of cutting tools such as an insert, a drill, and an endmill, and of tools including a stamping die, a forging die, a molding die, a punching die and trimming die.

Hard Coating

The coating 3a has a composition of $(Ti_a Cr_b Al_c Si_d Y_e R_f)(C_y N_z)$, the R being at least one element selected from Ho, Sm, Dy and La, and when the subscripts a, b, c, d, e, f, y and z denote atomic ratios respectively, the followings are satisfied, $0.05 \leq a \leq 0.3$,
$0.05 \leq b \leq 0.3$,
$0.4 \leq c \leq 0.65$,
$0 \leq d \leq 0.05$,
$0 \leq e \leq 0.05$,
$0.005 \leq f \leq 0.05$,
$a+b+c+d+e+f=1$,
$0 \leq y \leq 0.3$,
$0.7 \leq z \leq 1$, and
$y+z=1$.

In this way, a basic composition of the coating 3a is (TiCrAl)N having a cubic rocksalt structure, where TiN, CrN and AlN, having different lattice constants 0.424 nm, 0.412 nm and 0.414 nm respectively, are mixed, so that hardness of the coating is increased due to lattice distortion. In addition, R (at least one element selected from Ho, Sm, Dy and La) is added to such a composition. That is, in the embodiment of the invention, Ti is first added to increase hardness of the coating 3a as a whole, and at least one element selected from Ho, Sm, Dy and La is then added, so that remarkable improvement in oxidation resistance is achieved.

[Ti:$a(0.05 \leq a \leq 0.3, a+b+c+d+e+f=1)$]

The subscript a denotes an atomic ratio of Ti. Ti of 0.05 or more by atomic ratio needs to be added in order to increase hardness of the coating. However, since addition of Ti of more than 0.3 by atomic ratio causes reduction in oxidation resistance, 0.3 by atomic ratio is an upper limit. Preferably, Ti of 0.1 to 0.3 by atomic ratio is added.

[Cr:$b(0.05 \leq b \leq 0.3, a+b+c+d+e+f=1)$]

The subscript b denotes an atomic ratio of Cr. Cr is necessary to maintain the cubic crystal structure of the coating 3a to increase oxidation resistance, and needs to be added by 0.05 or more by atomic ratio. However, when Cr of more than 0.3 by atomic ratio is added, hardness of the coating 3a as a whole tends to be reduced, and therefore 0.3 by atomic ratio is an upper limit. Preferably, Cr of 0.1 to 0.3 by atomic ratio is added.

[Al:$c(0.4 \leq c \leq 0.65, a+b+c+d+e+f=1)$]

The subscript c denotes an atomic ratio of Al. AlN is originally a stable compound with a hexagonal crystal structure. However, AlN dissolves in TiN or CrN being stable cubic structure into metastable cubic structure AlN, leading to increase in hardness of the coating. Addition of Al results in formation of Al-rich oxide in a top surface, which improves oxidation resistance of the coating. Accordingly, Al of 0.4 or more by atomic ratio needs to be added. However, when Al of more than 0.65 by atomic ratio is added, a crystal structure of the coating 3a is changed into a hexagonal structure, leading to reduction in hardness of the coating. Therefore, 0.65 by atomic ratio is an upper limit. Preferably, Al of 0.45 to 0.55 by atomic ratio is added.

[Si:$d(0 \leq d \leq 0.05, a+b+c+d+e+f=1)$]

[Y:$e(0 \leq e \leq 0.05, a+b+c+d+e+f=1)$]

The subscript d denotes an atomic ratio of Si, and the subscript e denotes an atomic ratio of Y. Si and Y need not be necessarily added together, and either of Si and Y is effectively added for further improvement in oxidation resistance. Specifically, $d+e>0.01$ is preferable. More preferably, Si and Y are added together (specifically, $d>0.01$ and $e>0.01$). Each of Si and Y is effectively added by 0.05 or less by atomic ratio. When Si or Y of more than 0.05 by atomic ratio is added, a crystal structure of the coating 3a is changed, leading to reduction in hardness of the coating. Therefore, 0.05 by atomic ratio is an upper limit in each of Si and Y. Preferably, each of Si and Y is added by 0.03 or less by atomic ratio.

[R:$f(0.005 \leq f \leq 0.05, a+b+c+d+e+f=1)$]

The subscript f denotes an atomic ratio of R. R (at least one selected from Ho, Sm, Dy and La), which is necessary for improving oxidation resistance, needs to be added by 0.005 or more by atomic ratio. However, when R of more than 0.05 by atomic ratio is added, oxidation resistance is resultantly reduced. Therefore, 0.05 by atomic ratio is an upper limit. Preferably, R of 0.01 to 0.03 by atomic ratio is added. In particular, Ho or La particularly effectively improves oxidation resistance, and therefore is preferable as the additive element.

The R may be, for example, the element Ho, Sm, Dy or La being singly added. Alternatively, for example, the R may include La and at least one element selected from Ho, Sm and Dy, namely, may be a combination of La and at least one of Ho, Sm and Dy. At least one element selected from Ho, Sm and Dy may be added without adding La. Among the elements that improve oxidation resistance of the coating, Si, Y, Ho, Sm or Dy is added to densify an oxide film formed on a surface of the coating so as to improve oxidation resistance of the coating. In contrast, La is added to suppress diffusion of elements in the coating so as to improve the oxidation resistance. Therefore, such elements, which have different mechanisms for improving oxidation resistance, are mixedly added, thereby further improvement in oxidation resistance may be achieved.

[C:$y(0 \leq y \leq 0.3, y+z=1)$]

The subscript y denotes an atomic ratio of C. A compound according to the embodiment of the invention may be not only in a form of nitride but also in a form of carbonitride through introduction of a gas containing C during deposition. In such a case, when C of more than 0.3 by atomic ratio is added, oxidation resistance and hardness of the coating are reduced, and therefore 0.3 by atomic ratio is an upper limit. Preferably, C of 0.2 or less by atomic ratio is added.

[N:$z(0.7 \leq z \leq 1, y+z=1)$]

The subscript z denotes an atomic ratio of N. N is an indispensable element for increasing hardness of the coating $3a$ to improve oxidation resistance, and needs to be added by 0.7 or more by atomic ratio.

As described before, Ti, Cr, Al, R and N are indispensable components, and Si, Y and C are optional components. Therefore, a component combination of the coating $3a$ includes (TiCrAlR)N, (TiCrAlSiR)N, (TiCrAlYR)N, (TiCrAlSiYR)N, (TiCrAlR)(CN), (TiCrAlSiR)(CN), (TiCrAlYR)(CN) and (TiCrAlSiYR)(CN).

Second Embodiment

As shown in FIG. 1, a hard-coating-coated member (member) 1 (1$b$) according to another embodiment of the invention includes a hard coating (coating) 3 (3$b$) on a substrate 2.

Hereinafter, the member is specifically described. Since the substrate 2 is the same as the substrate 2 in the first embodiment, description of the substrate is omitted.

Hard Coating

The coating $3b$ has a composition of $(Ti_aCr_bAl_cSi_dY_eR_fHf_g)(C_yN_z)$, the R being at least one element selected from Ho, Sm, Dy and La, and when the subscripts a, b, c, d, e, f, g, y and z denote atomic ratios respectively, the followings are satisfied, $0.05 \leq a \leq 0.3$,
$0.05 \leq b \leq 0.3$,
$0.4 \leq c \leq 0.6$,
$0 \leq d \leq 0.05$,
$0 \leq e \leq 0.05$,
$0.005 \leq f \leq 0.05$,
$0 < g \leq 0.35$,
$a+b+c+d+e+f+g=1$,
$0 \leq y \leq 0.3$,
$0.7 \leq z \leq 1$, and
$y+z=1$.

In the coating $3b$ of the member $1b$ of the second embodiment, Hf is additionally contained in the composition of the coating $3a$ of the member $1a$ of the first embodiment. In addition, the content of Al is correspondingly 0.6 or less by atomic ratio. Other configurations are the same as in the first embodiment except that $a+b+c+d+e+f+g=1$ is given, therefore description of them is omitted here, and only upper limits of Hf and Al are described.

[Hf:$g(0<g \leq 0.35, a+b+c+d+e+f+g=1)$]

[Al:$c(0.4 \leq c \leq 0.6, a+b+c+d+e+f+g=1)$]

The subscript g denotes anatomic ratio of Hf. Hf having a relatively large lattice constant (HfN, 0.452 nm) is added into the coating $3b$, thereby hardness of the coating $3b$ is increased. When such an effect is expected, Hf of 0.01 or more by atomic ratio is preferably added. However, when Hf of more than 0.35 by atomic ratio is added, a crystal structure of the coating $3b$ tends to be changed into a hexagonal structure, leading to reduction in hardness of the coating. Preferably, Hf of 0.2 or less, and more preferably, 0.15 or less by atomic ratio is added.

When Hf is added, a crystal structure of the coating tends to be changed into a hexagonal structure, therefore the content of Al needs to be up to 0.6 by atomic ratio.

As described before, Ti, Cr, Al, R, Hf and N are indispensable components, and Si, Y and C are optional components. Therefore, a component combination of the coating $3b$ includes (TiCrAlRHf) N, (TiCrAlSiRHf) N, (TiCrAlYRHf) N, (TiCrAlSiYRHf) N, (TiCrAlRHf) (CN), (TiCrAlSiRHf) (CN), (TiCrAlYRHf) (CN) and (TiCrAlSiYRHf) (CN).

In the member 1 (1$a$ or 1$b$), while the coating 3 (3$a$ or 3$b$) is preferably formed by an arc-ion-plating evaporation method, the coating may be formed by an unbalanced magnetron sputtering evaporation method. As a deposition apparatus using the arc-ion-plating evaporation method, for example, the following deposition apparatus is used.

As shown in FIG. 2, a deposition apparatus 10 has a chamber 11 having an evacuation port for evacuation, a gas supply port 15 for supplying a deposition gas and a noble gas, an arc source 13 connected to an arc evaporation source 12, a support stage 17 on a substrate stage 16 for supporting a processing object (substrate 2), and a bias supply 14 applying a negative bias voltage to the processing object through the support stage 17 between the support stage 17 and the chamber 11. Furthermore, the apparatus 10 has a heater 18, a DC power supply for discharge 19, an AC power supply for filament heating 20, and a filament 21. In deposition for obtaining the member according to the embodiment of the invention, a mixed gas of deposition gases such as nitrogen ($N_2$) and methane ($CH_4$) in accordance with deposition components (coating composition) and a noble gas such as argon is used as a gas supplied from the gas supply port 15 into the chamber 11.

In an example of a deposition method, first, the substrate 2 is introduced into the deposition apparatus 10, then the apparatus is evacuated to $1*10^{-3}$ Pa or less, and then the substrate 2 is heated to 550° C. Then, sputter cleaning is performed by using Ar ions, and then nitrogen is introduced into the chamber 11 up to 4 Pa, and then each of targets is used to form nitride on the substrate 2 by arc discharge with a current value of 150 A. When C is contained in the coating, methane gas is also introduced within a range of 0.1 to 0.5 Pa. In deposition, a bias voltage is −100 V with respect to ground potential.

A composition of the coating 3 may be measured, for example, by EDX analysis with EDX (Energy Dispersive X-ray spectrometer).

Next, a tool according to an embodiment of the invention is described.

Tool

The tool, which is not shown, has the hard-coating-coated member 1 (1$a$ or 1$b$). Since the tool has the member 1, the tool has good wear resistance, and may be preferably used as a cutting tool or a molding tool such as die while improving durability of such a tool. The cutting tool may include, for example, a tip, a drill, and an endmill. The die may include, for example, a plastic working die such as a stamping die, a forging die or a molding die, a shearing die such as a punching die or trimming die, and a die-cast die.

Next, a target according to an embodiment of the invention is described.

Target

The target, being not shown, is used to deposit a hard coating, here the hard coating 3 (3$a$ or 3$b$), by an arc ion plating process. The target contains the same metal elements (including a semi-metal element, Si) and the same rare-earth elements as in the coating 3 (3$a$ or 3$b$) in the same composition ratio as in the coating 3 (3$a$ or 3$b$). That is, the target contains the same metal elements (Ti, Cr, Al and Si) and the same rare-earth elements (Y, Ho, Sm, Dy and La) as in the coating $3a$ in the first embodiment in the same composition ratio as in the coating $3a$, or contains the same metal elements (Ti, Cr, Al, Si and Hf) and the same rare-earth elements (Y, Ho, Sm, Dy and La) as in the coating 3b in the second embodiment in the same composition ratio as in the coating 3b.

A manufacturing method of the target, which is not particularly limited, includes, for example, a powder metallurgy method as an effective method for obtaining the target, in which materials including Ti powder, Cr powder, Al powder, Si powder, Y powder, Hf powder and powder of the element R, which have been appropriately adjusted in quantity ratio, particle size and the like, are uniformly mixed by a V mixer or the like into mixed powder, and then the mixed powder is subjected to cold isostatic pressing (CIP) treatment or hot isostatic pressing (HIP) treatment. When the target is formed by a method using the HIP treatment (HIP method), HIP treatment is preferably performed at a condition of a sintering temperature of 400 to 500° C. and a pressure of 1000 atmospheres.

In addition, the target may be manufactured by a hot extrusion method, an ultra-high-pressure hot pressing method, a hot forging method, a warm forging method or the like. Furthermore, the method includes a method where mixed powder is prepared in the same way as above, and then the mixed powder is subjected to hot pressing (HP) treatment so that a target is manufactured, or includes a method using beforehand alloyed powder instead of the mixed powder so that a target is obtained through CIP treatment or HIP treatment of the alloyed powder or melt and solidification of the powder.

Example

An example and a comparable example of the invention are described below. The invention is not limited to the example, and various modifications or alterations may be made within the scope without departing from the gist of the invention, all of which are encompassed within the technical scope of the invention.

A coating was formed on a substrate by using a cathode-discharge arc ion plating apparatus as a deposition apparatus as shown in FIG. 2 with various kinds of targets prepared by a powder metallurgy method, the substrate including a mirror-polished sintered hard metal (JIS P) substrate, a sintered-hard-alloy endmill (10 mm in diameter, six flutes), and a platinum foil (30 mm long, 5 mm wide and 0.1 mm thick). The targets were prepared by the HIP method, in which solidification/fining was at a sintering temperature of 500° C. and a pressure of 1000 atmospheres.

First, a substrate was introduced into the deposition apparatus, then the apparatus was evacuated to $1*10^{-3}$ Pa or less, and then the substrate was heated to 550° C. Then, sputter cleaning was performed by using Ar ions, and then nitrogen was introduced into a chamber up to 4 Pa, and then each of the targets was used to form nitride on the substrate by arc discharge with a current value of 150 A. When C was contained in a coating, methane gas was also introduced within a range of 0.1 to 0.5 Pa. In deposition, bias voltage was −100 V with respect to ground potential.

When deposition was finished, a composition of metal components in each coating was analyzed, and hardness and oxidation start temperature of each coating were measured, and besides wear resistance was evaluated. These are described in the following, and results are shown in Tables 1 to 3. In the Tables, "−" means that the relevant component is not contained, and a numeral value that does not meet the configuration of the invention is shown with an underline.

Coating Composition

As a composition of a deposited coating, a composition of metal elements in each coating on the sintered hard metal substrate was measured by EDX analysis.

Hardness

As hardness of each coating, Vickers hardness of the coating on the sintered hard metal substrate was measured (normal temperature, load 0.25 N, and holding time 15 sec).

Oxidation Start Temperature

For the oxidation start temperature, a thermo balance was used, and each coating sample on the platinum foil was heated in dry air (heating rate 4° C./min), and increase in oxidation (increase in oxide mass) was measured to determine the oxidation start temperature of each coating. A temperature at which sudden increase in oxide mass was observed was defined as the oxidation start temperature.

Wear Resistance

For wear resistance, a cutting test was performed at the following condition with a sintered-hard-alloy endmill covered with a coating, and wear amount (wear width) of a flute relief surface was measured for evaluation of wear resistance. A sample with wear amount of 100 μm or less was assumed to be acceptable.

| Cutting test condition | |
|---|---|
| Work material: | SKD11 (HRC60) |
| Cutting speed | 150 m/min |
| Feed: | 0.05 m/tooth |
| Axial depth of cut: | 5 mm |
| Radial depth of cut: | 0.1 mm |
| Cutting length: | 100 m |
| Others: | down cut, dry cut, and air blow only |

TABLE 1

| | No. | Composition (atomic ratio) | | | | | | | | | Hardness (GPa) | Oxidation start temperature (° C.) | Wear resistance Wear amount (μm) |
|---|---|---|---|---|---|---|---|---|---|---|---|---|---|
| | | Ti | Cr | Al | Si | Y | R Element | Hf | C | N | | | |
| Example | 1 | 0.2 | 0.2 | 0.565 | 0.02 | 0.01 | Ho | 0.005 | — | — | 1 | 30 | 1100 | 80 |
| | 2 | 0.2 | 0.2 | 0.55 | 0.02 | 0.01 | Ho | 0.02 | — | — | 1 | 37 | 1350 | 20 |
| | 3 | 0.2 | 0.2 | 0.52 | 0.02 | 0.01 | Ho | 0.05 | — | — | 1 | 33 | 1300 | 50 |
| | 4 | 0.2 | 0.2 | 0.55 | 0.02 | 0.01 | Sm | 0.02 | — | — | 1 | 32 | 1150 | 40 |
| | 5 | 0.2 | 0.2 | 0.55 | 0.02 | 0.01 | Dy | 0.02 | — | — | 1 | 33 | 1200 | 50 |
| | 6 | 0.2 | 0.2 | 0.55 | 0.02 | 0.01 | Ho, Sm | 0.02 | — | — | 1 | 34 | 1250 | 30 |
| | 7 | 0.2 | 0.2 | 0.55 | 0.03 | — | Ho | 0.02 | — | — | 1 | 34 | 1200 | 30 |
| | 8 | 0.2 | 0.2 | 0.55 | — | 0.03 | Ho | 0.02 | — | — | 1 | 33 | 1200 | 25 |
| | 9 | 0.275 | 0.275 | 0.4 | 0.02 | 0.01 | Ho | 0.02 | — | — | 1 | 32 | 1200 | 70 |
| | 10 | 0.15 | 0.15 | 0.65 | 0.02 | 0.01 | Ho | 0.02 | — | — | 1 | 31 | 1250 | 75 |

TABLE 1-continued

| | | | | Composition (atomic ratio) | | | | | | | Hardness | Oxidation start temperature | Wear resistance Wear amount |
|---|---|---|---|---|---|---|---|---|---|---|---|---|---|
| | | | | | | R | | | | | | | |
| | No. | Ti | Cr | Al | Si | Y | Element | | Hf | C | N | (GPa) | (° C.) | (μm) |
| | 11 | 0.05 | 0.3 | 0.6 | 0.02 | 0.01 | Ho | 0.02 | — | — | 1 | 30 | 1200 | 80 |
| | 12 | 0.3 | 0.1 | 0.55 | 0.02 | 0.01 | Ho | 0.02 | — | — | 1 | 36 | 1300 | 25 |
| | 13 | 0.3 | 0.05 | 0.6 | 0.02 | 0.01 | Ho | 0.02 | — | — | 1 | 32 | 1250 | 65 |
| | 14 | 0.1 | 0.3 | 0.55 | 0.02 | 0.01 | Ho | 0.02 | — | — | 1 | 36 | 1300 | 30 |
| | 15 | 0.2 | 0.2 | 0.55 | 0.02 | 0.01 | Ho | 0.02 | — | 0.1 | 0.9 | 38 | 1350 | 20 |
| | 16 | 0.2 | 0.2 | 0.55 | 0.02 | 0.01 | Ho | 0.02 | — | 0.3 | 0.7 | 37 | 1350 | 25 |

In No. 6, Ho and Sm are added by 0.01 each.

TABLE 2

| | | | | Composition (atomic ratio) | | | | | | | | Hardness | Oxidation start temperature | Wear resistance Wear amount |
|---|---|---|---|---|---|---|---|---|---|---|---|---|---|---|
| | | | | | | | R | | | | | | | |
| | No. | Ti | Cr | Al | Si | Y | Element | | Hf | C | N | (GPa) | (° C.) | (μm) |
| Example | 17 | 0.2 | 0.2 | 0.58 | — | — | Ho | 0.02 | — | — | 1 | 33 | 1200 | 60 |
| | 18 | 0.195 | 0.195 | 0.55 | 0.02 | 0.01 | Ho | 0.02 | 0.01 | — | 1 | 39 | 1350 | 15 |
| | 19 | 0.15 | 0.15 | 0.55 | 0.02 | 0.01 | Ho | 0.02 | 0.1 | — | 1 | 42 | 1400 | 10 |
| | 20 | 0.1 | 0.1 | 0.55 | 0.02 | 0.01 | Ho | 0.02 | 0.2 | — | 1 | 37 | 1300 | 25 |
| | 21 | 0.05 | 0.05 | 0.55 | 0.02 | 0.01 | Ho | 0.02 | 0.3 | — | 1 | 35 | 1250 | 35 |
| | 22 | 0.1 | 0.1 | 0.55 | 0.02 | 0.01 | Ho | 0.02 | 0.2 | 0.1 | 0.9 | 35 | 1250 | 30 |
| | 23 | 0.165 | 0.165 | 0.55 | — | — | Ho | 0.02 | 0.1 | — | 1 | 36 | 1250 | 45 |
| | 24 | 0.15 | 0.15 | 0.55 | 0.03 | — | Ho | 0.02 | 0.1 | — | 1 | 41 | 1300 | 15 |
| | 25 | 0.155 | 0.155 | 0.55 | — | 0.02 | Ho | 0.02 | 0.1 | — | 1 | 42 | 1300 | 15 |
| | 26 | 0.2 | 0.2 | 0.58 | — | — | La | 0.02 | — | — | 1 | 34 | 1250 | 25 |
| | 27 | 0.2 | 0.2 | 0.53 | 0.05 | — | La | 0.02 | — | — | 1 | 36 | 1300 | 20 |
| | 28 | 0.2 | 0.2 | 0.56 | — | 0.02 | La | 0.02 | — | — | 1 | 36 | 1300 | 22 |
| | 29 | 0.2 | 0.2 | 0.53 | 0.03 | 0.02 | La | 0.02 | — | — | 1 | 38 | 1350 | 15 |
| | 30 | 0.2 | 0.2 | 0.57 | — | — | La, Ho | 0.03 | — | — | 1 | 37 | 1300 | 18 |
| | 31 | 0.2 | 0.2 | 0.52 | 0.03 | 0.02 | La, Ho | 0.03 | — | — | 1 | 40 | 1400 | 10 |
| | 32 | 0.15 | 0.15 | 0.52 | 0.03 | 0.02 | La, Ho | 0.03 | 0.1 | — | 1 | 41 | 1450 | 8 |

In No. 30 to No. 32, La and Ho are added by 0.015 each.

TABLE 3

| | | | | Composition (atomic ratio) | | | | | | | | Hardness | Oxidation start temperature | Wear resistance Wear amount |
|---|---|---|---|---|---|---|---|---|---|---|---|---|---|---|
| | | | | | | | R | | | | | | | |
| | No. | Ti | Cr | Al | Si | Y | Element | | Hf | C | N | (GPa) | (° C.) | (μm) |
| Comparative example | 33 | <u>0.5</u> | — | 0.5 | — | — | — | — | — | — | 1 | 25 | 800 | 250 |
| | 34 | 0.2 | 0.2 | 0.57 | 0.02 | 0.01 | — | — | — | — | 1 | 28 | 1000 | 130 |
| | 35 | 0.2 | 0.2 | 0.47 | 0.02 | 0.01 | Ho | <u>0.1</u> | — | — | 1 | 25 | 1200 | 150 |
| | 36 | 0.2 | 0.2 | 0.51 | <u>0.07</u> | — | Ho | 0.02 | — | — | 1 | 25 | 1100 | 140 |
| | 37 | 0.2 | 0.2 | 0.51 | — | <u>0.07</u> | Ho | 0.02 | — | — | 1 | 27 | 1150 | 135 |
| | 38 | <u>0.325</u> | <u>0.325</u> | <u>0.3</u> | 0.02 | 0.01 | Ho | 0.02 | — | — | 1 | 29 | 900 | 140 |
| | 39 | 0.1 | 0.1 | <u>0.75</u> | 0.02 | 0.01 | Ho | 0.02 | — | — | 1 | 26 | 1200 | 160 |
| | 40 | — | 0.3 | 0.65 | 0.02 | 0.01 | Ho | 0.02 | — | — | 1 | 28 | 1100 | 140 |
| | 41 | <u>0.4</u> | 0.1 | 0.45 | 0.02 | 0.01 | Ho | 0.02 | — | — | 1 | 26 | 1000 | 150 |
| | 42 | 0.3 | — | 0.65 | 0.02 | 0.01 | Ho | 0.02 | — | — | 1 | 30 | 1100 | 120 |
| | 43 | 0.1 | <u>0.4</u> | 0.45 | 0.02 | 0.01 | Ho | 0.02 | — | — | 1 | 28 | 1200 | 110 |
| | 44 | 0.2 | 0.2 | 0.55 | 0.02 | 0.01 | Ho | 0.02 | — | <u>0.4</u> | <u>0.6</u> | 30 | 1100 | 120 |
| | 45 | <u>0.325</u> | <u>0.325</u> | <u>0.3</u> | 0.02 | 0.01 | Ho | 0.02 | — | 0.2 | 0.8 | 28 | 900 | 150 |
| | 46 | <u>0.01</u> | 0.3 | 0.64 | — | — | Ho | 0.05 | — | — | 1 | 29 | 1100 | 110 |
| | 47 | 0.05 | 0.05 | 0.45 | 0.02 | 0.01 | Ho | 0.02 | <u>0.4</u> | — | 1 | 27 | 900 | 130 |
| | 48 | 0.275 | 0.275 | <u>0.3</u> | 0.02 | 0.01 | Ho | 0.02 | 0.1 | 0.2 | 0.8 | 28 | 900 | 150 |
| | 49 | 0.125 | 0.125 | <u>0.65</u> | 0.02 | 0.01 | Ho | 0.02 | 0.05 | — | 1 | 26 | 1100 | 120 |

As shown in Tables 1 to 3, the example of the invention Nos. 1 to 32, which satisfy the requirements of the invention, are remarkably small in wear amount compared with the comparative example Nos. 33 to 49, which do not satisfy the requirements of the invention, showing good wear resistance. In particular, for samples Nos. 1 to 25, samples Nos. 2, 6, 7, 8, 12, 14, 15, 16, 18, 19, 20, 22, 24 and 25, which contain Ho as R, and have the content of each of Ti, Cr, Al, Si, Y and R (and Hf in some cases) in a preferable range, have high wear resistance (wear amount 30 μm or less). Particularly, samples Nos. 18, 19, 24 and 25, containing Hf of 0.01 to 0.15 by atomic ratio, have extremely high wear resistance (wear amount 15 μm or less).

For samples Nos. 26 to 32, samples containing La as R (Nos. 26 to 32) also have high wear resistance (wear amount 25 μm or less). In particular, samples mixedly added with La and Ho (Nos. 30 to 32) have particularly high wear resistance (wear amount 18 μm or less). Furthermore, samples (Nos. 29, 31 and 32), containing La as R and having the content of each of Ti, Cr, Al, Si, Y and R (and Hf in some cases) in a preferable range, have considerably high wear resistance (wear amount 15 μm or less). In particular, a sample containing Hf of 0.01 to 0.15 by atomic ratio (No. 32) has extremely high wear resistance (wear amount 8 μm or less).

On the other hand, as shown in Table 3, the comparative examples Nos. 33 to 49, which do not satisfy the requirements of the invention, are bad in wear resistance. That is, the sample No. 33, in which the content of Ti is more than the upper limit value and the content of each of Cr and R is less than the lower limit value, is bad in wear resistance. The sample No. 34, in which the content of R is less than the lower limit value, is bad in wear resistance. The sample No. 35, in which the content of R is more than the upper limit value, is bad in wear resistance.

The sample No. 36, in which the content of Si is more than the upper limit value, is bad in wear resistance. The sample No. 37, in which the content of Y is more than the upper limit value, is bad in wear resistance. The sample No. 38, in which the content of each of Ti and Cr is more than the upper limit value and the content of Al is less than the lower limit value, is bad in wear resistance. The sample No. 39, in which the content of Al is more than the upper limit value, is bad in wear resistance. The sample No. 40, in which the content of Ti is less than the lower limit value, is bad in wear resistance.

The sample No. 41, in which the content of Ti is more than the upper limit value, is bad in wear resistance. The sample No. 42, in which the content of Cr is less than the lower limit value, is bad in wear resistance. The sample No. 43, in which the content of Cr is more than the upper limit value, is bad in wear resistance. The sample No. 44, in which the content of C is more than the upper limit value and the content of N is less than the lower limit value, is bad in wear resistance.

The sample No. 45, in which the content of each of Ti and Cr is more than the upper limit value and the content of Al is less than the lower limit value, is bad in wear resistance. The sample No. 46, in which the content of Ti is less than the lower limit value, is bad in wear resistance. The sample No. 47, in which the content of Hf is more than the upper limit value, is bad in wear resistance. The sample No. 48, in which the content of Al is less than the lower limit value, is bad in wear resistance. The sample No. 49, in which the content of Al is more than the upper limit value, is bad in wear resistance.

While the hard-coating-coated member, the tool, and the target according to the invention have been described in detail with the embodiments and the examples hereinbefore, the gist of the invention is not limited to the described content, and the scope of the right of the invention must be widely interpreted based on the description of the claims. It will be appreciated that the content of the invention can be widely modified or altered based on the description.

What is claimed is:

1. A hard-coating-coated member comprising a hard coating on a substrate,
   wherein the hard coating has a composition of $(Ti_a Cr_b Al_c Si_d Y_e R_f)(C_y N_z)$,
   the R is at least one element selected from the group consisting of Ho, Sm, Dy, and La, and
   subscripts a, b, c, d, e, f, y and z denoting atomic ratios satisfy relations shown as follows:
   $0.05 \leq a \leq 0.3$;
   $0.05 \leq b \leq 0.3$;
   $0.4 \leq c \leq 0.65$;
   $0 \leq d \leq 0.05$;
   $0 \leq e \leq 0.05$;
   $0.005 \leq f \leq 0.05$;
   $a+b+c+d+e+f=1$;
   $0 \leq y \leq 0.3$;
   $0.7 \leq z \leq 1$; and
   $y+z=1$.

2. The hard-coating-coated member according to claim 1, wherein the R is at least one element selected from the group consisting of Ho, Sm, and Dy.

3. The hard-coating-coated member according to claim 1, wherein the R comprises La and at least one element selected from the group consisting of Ho, Sm, and Dy.

4. A hard-coating-coated member having comprising a hard coating on a substrate,
   wherein the hard coating has a composition of $(Ti_a Cr_b Al_c Si_d Y_e R_f Hf_g)(C_y N_z)$,
   the R is at least one element selected from the group consisting of Ho, Sm, Dy, and La, and
   subscripts a, b, c, d, e, f, g, y and z denoting atomic ratios satisfy relations shown as follows:
   $0.05 \leq a \leq 0.3$;
   $0.05 \leq b \leq 0.3$;
   $0.4 \leq c \leq 0.6$;
   $0 \leq d \leq 0.05$;
   $0 \leq e \leq 0.05$;
   $0.005 \leq f \leq 0.05$;
   $0 < g \leq 0.35$;
   $a+b+c+d+e+f+g=1$;
   $0 \leq y \leq 0.3$;
   $0.7 \leq z \leq 1$; and
   $y+z=1$.

5. The hard-coating-coated member according to claim 4, wherein the R is at least one element selected from the group consisting of Ho, Sm, and Dy.

6. The hard-coating-coated member according to claim 4, wherein the R comprises La and at least one element selected from the group consisting of Ho, Sm, and Dy.

7. A tool comprising:
   the hard-coating-coated member according to any one of claims 1 to 6.

8. A target for forming a hard coating by an arc ion plating process,
   wherein the target contains the same metal elements and the same rare-earth elements as in the hard coating according to any one of claims 1 to 6 in the same composition ratio as in the hard coating.

9. The hard-coating-coated member according to claim 1, wherein $0.05 \leq b \leq 0.275$.

10. The hard-coating-coated member according to claim 1, wherein $0 < e \leq 0.05$.

11. The hard-coating-coated member according to claim 4, wherein $0 < e \leq 0.05$.

12. The hard-coating-coated member according to claim 4, wherein $0.1 < g \leq 0.35$.

* * * * *